(12) United States Patent
Lin

(10) Patent No.: US 6,609,596 B1
(45) Date of Patent: Aug. 26, 2003

(54) AUTOMATIC BRAKE DEVICE FOR AN ELECTRIC SCOOTER

(76) Inventor: Samuel Lin, 6, Kung Yeh 2 Rd., Tou Chiao Industrial Park, Min Hsiung Hsiang, Chia Yi Hsien (TW)

( * ) Notice: Subject to any disclaimer, the term of this patent is extended or adjusted under 35 U.S.C. 154(b) by 0 days.

(21) Appl. No.: 10/075,202

(22) Filed: Feb. 15, 2002

(51) Int. Cl.⁷ .............................. B60L 7/00; B60K 28/00
(52) U.S. Cl. ........................ 188/158; 180/271; 188/2 R
(58) Field of Search ................................. 188/158, 2 R, 188/19; 180/170, 171, 172, 174, 178, 179, 271, 282, 283; 200/61.27, 61.35, 564, 568, 569

(56) References Cited

U.S. PATENT DOCUMENTS

| | | | | |
|---|---|---|---|---|
| 3,299,225 A | * | 1/1967 | Heath ........................ | 200/569 |
| 4,103,132 A | * | 7/1978 | Schwarzkopf .............. | 200/568 |
| 4,386,674 A | * | 6/1983 | Sugata ........................ | 180/282 |
| 4,638,290 A | * | 1/1987 | Wagner .................... | 200/61.35 |
| 4,704,541 A | * | 11/1987 | Leiber ........................ | 180/282 |
| 2002/0003055 A1 | * | 1/2002 | Leitner et al. .............. | 180/170 |

FOREIGN PATENT DOCUMENTS

JP     02136328 A   *   5/1990    ................. 180/78

* cited by examiner

*Primary Examiner*—Jack Lavinder
*Assistant Examiner*—Thomas J. Williams
(74) *Attorney, Agent, or Firm*—Varndell & Varndell, PLLC

(57) ABSTRACT

A brake device has a cam and a switch. The cam is securely attached to the steering bar of the electric scooter. The cam has a circular periphery with a plain portion and a notch. The switch is secured to the body of the electric scooter and is electrically connected to the actuator. The switch has an arm with a distal end abutting either the plain portion or the notch according to whether the scooter is turning or traveling straight. With such a brake device, the scooter will be automatically slowed down when the scooter is turned right or left.

3 Claims, 5 Drawing Sheets

AUTOMATIC BRAKE DEVICE FOR AN ELECTRIC SCOOTER

BACKGROUND OF THE INVENTION

1. Field of the Invention

The present invention relates to a brake device, and more particularly to an automatic brake device for an electric scooter to slow down the scooter when the scooter is turned right or left.

2. Description of Related Art

Electric scooters have become popular with elderly and disabled people as such vehicles provide new mobility and interest. The conventional electric scooter usually includes a hand brake mounted on the handle or a foot brake mounted on a platform of the electric scooter, such that the user can control the speed of the scooter with the hand brake or the foot brake. However, it is often true that those people who need the scooter to assist their movement are not able to control the handle and brake device at the same time when the electric scooter is turned right or left. Thus the rider may lose balance when the scooter is in a sharp turn at a relative high speed.

To overcome the shortcomings, the present invention tends to provide an automatic brake device to mitigate or obviate the aforementioned problems.

SUMMARY OF THE INVENTION

The main objective of the present invention is to provide an automatic brake device for an electric scooter and that can slow down the scooter when the scooter is in a turn. To achieve the objective, the brake device has a cam and a switch. The cam is securely attached to the steering bar of the electric scooter. The cam has an round periphery and a notch defined in the periphery of the cam. The switch is secured to the body of the electric scooter and is electrically connected to the actuator. The switch has an arm with a distal end abutting an inner surface of the notch. When the scooter is turned, the cam will rotate with the steering bar and the distal end of the arm will escape from the notch and will abut the periphery of the cam. Consequently, the switch will send a signal to the actuator to slow down the actuator. With such a brake device, the scooter will be automatically slowed down when the scooter is turned, thus the safety in riding the electric scooter is improved relative to the prior art.

Further benefits and advantages of the present invention will become apparent after a careful reading of the detailed description with appropriate reference to the accompanying drawings.

DETAILED DESCRIPTION OF THE INVENTION

Figure 1:
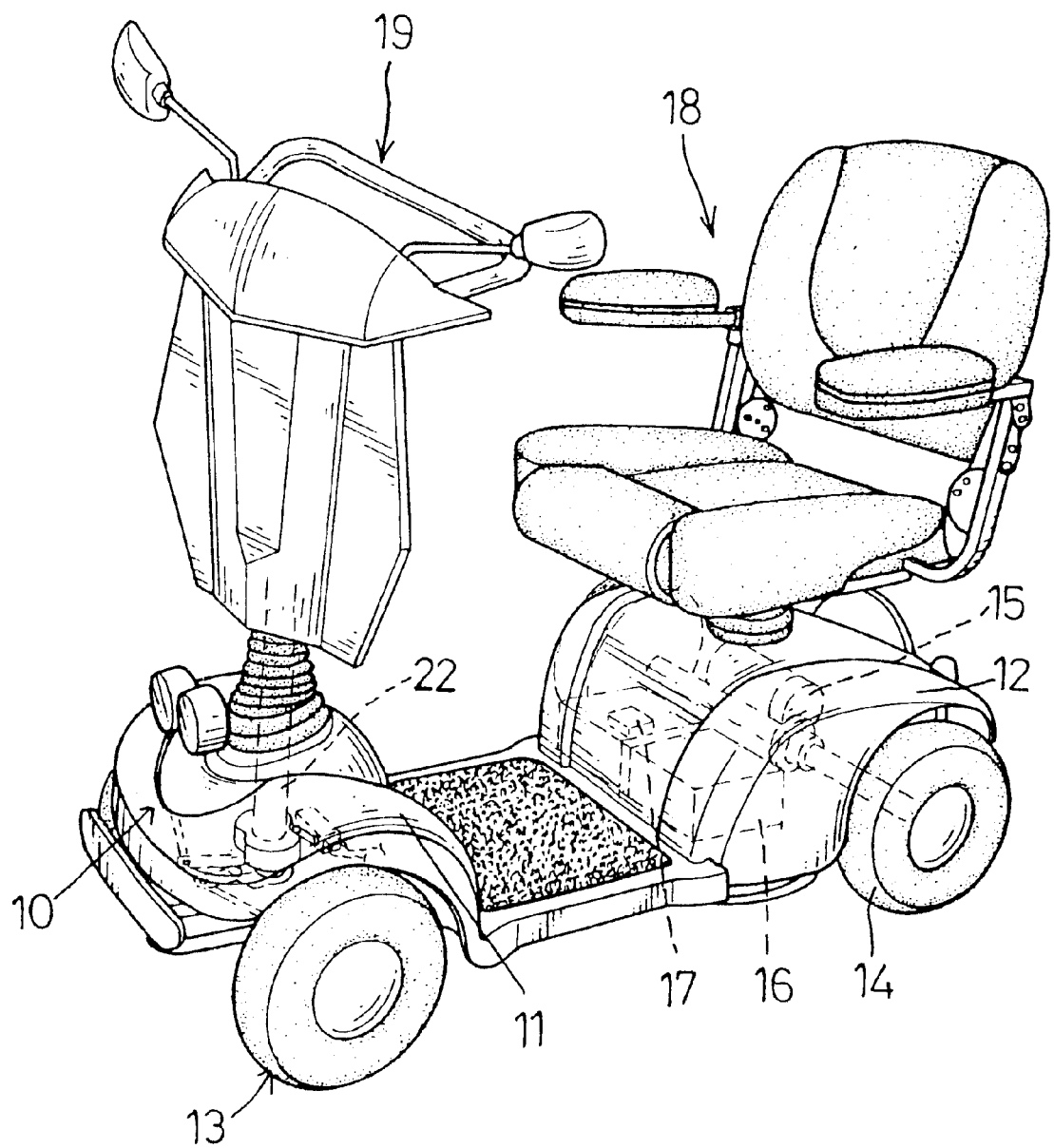
FIG. 1 is a perspective view of an electric scooter with an automatic brake device in accordance with the present invention.
Figure 2:
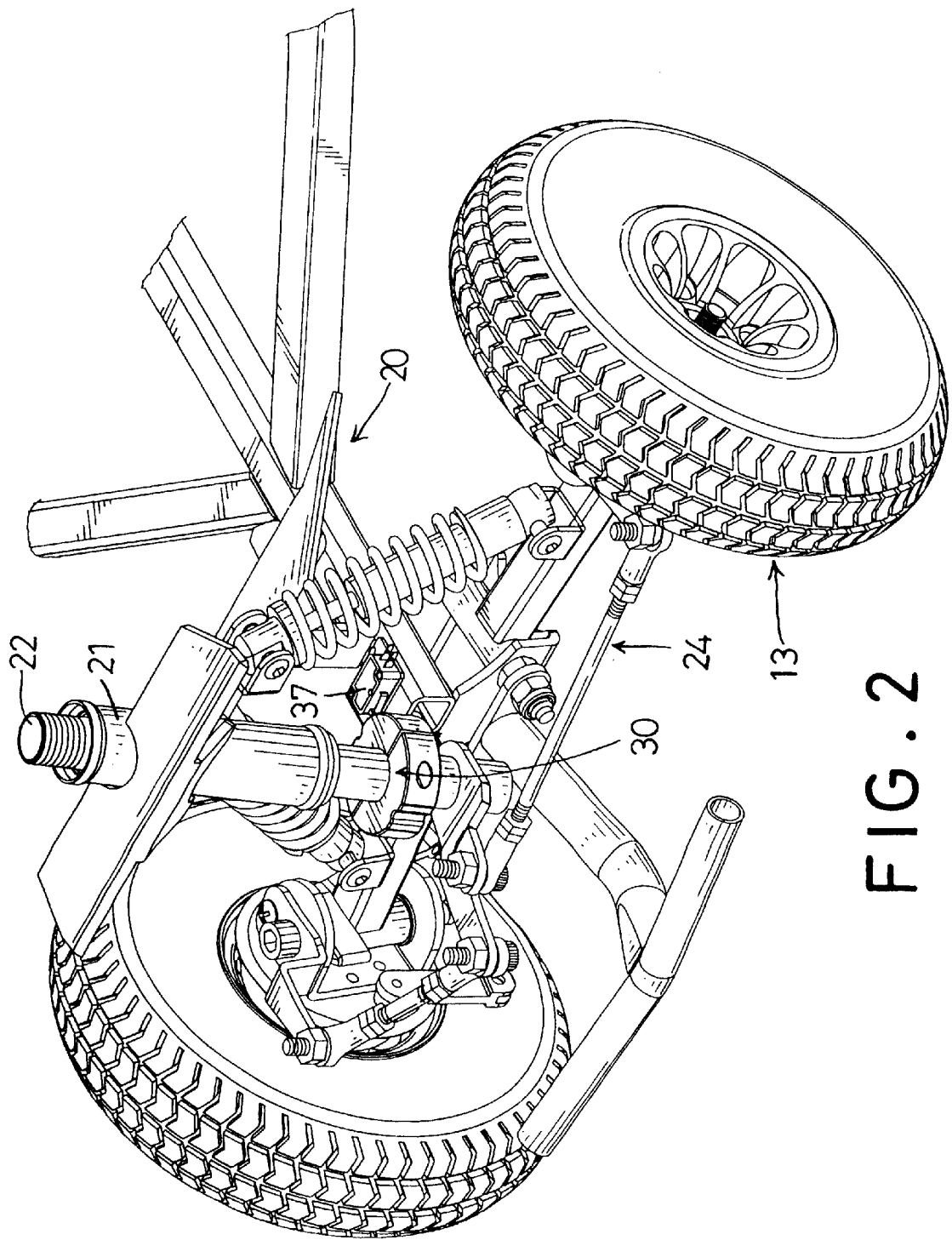
FIG. 2 is a perspective view of a steering bar of the electric scooter with the brake device in accordance with the present invention.

With reference to FIGS. 1 and 2, an electric scooter (10) substantially comprises a body (20), at least one front wheel (13), two rear wheels (14), an actuator (15) and a steering bar (22). The front wheel (13) is rotatably attached to one end of the body (20), and the rear wheels (14) are rotatably attached to the other end of the body (20). A front cover (11) and a rear cover (12) are respectively attached to two ends of the body (20) to respectively cover the front wheel (13) and the rear wheels (14). The actuator (15) is mounted on the body (20) to actuate the rear wheels (14) to rotate. The actuator is always an electric motor. A battery box (16) is mounted on the body (20) to provide an electric power to the actuator (15). A controller (17) is mounted on the body (20) to control the operation of the actuator (15).

With reference to FIGS. 1 and 2, the steering bar (22) is rotatably attached to the body (20) by extending through a sleeve (21) secured on the body (20). The steering bar (22) is connected to the front wheel (13) with a linking device (24) to pivotally turn the front wheel (13) relative to the body (20) so as to control the travel direction of the scooter (10). A handle (19) is mounted on the top of the steering bar (22) for a rider to grip. A seat (18) is mounted on the body (20) for the rider to mount the scooter (10) in a sitting condition.

Figure 3:
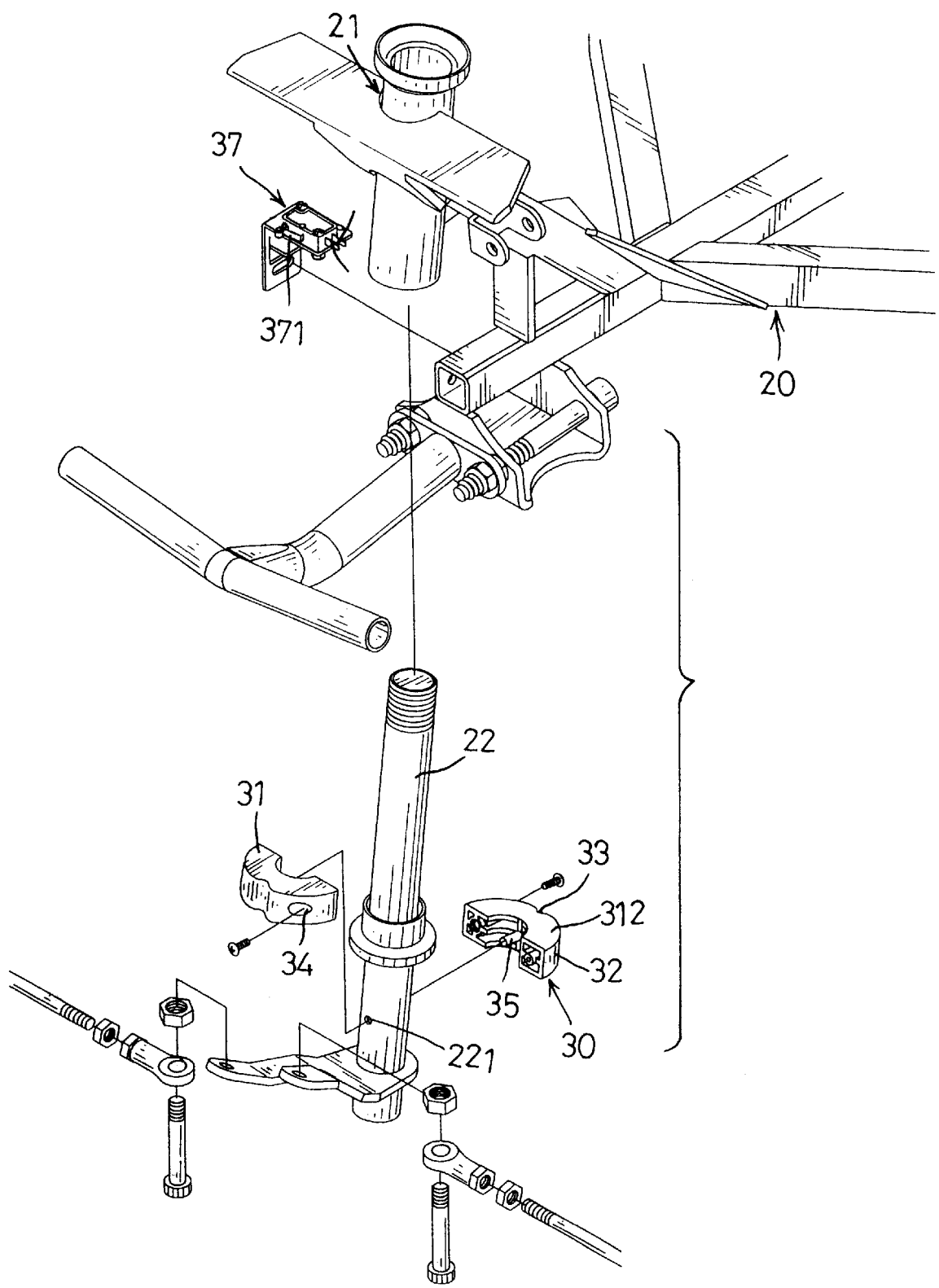
FIG. 3 is an exploded perspective view of the steering bar and the brake device in FIG. 2.

With reference to FIGS. 2 and 3, an automatic brake device for the electric scooter (10) in accordance with the present invention comprises a cam (30) and a switch (37). The cam (30) is securely attached to the steering bar (22) to rotate with the steering bar (22). The cam (30) is composed of a first half (31) and a second half (312) engaging with the first half (31). The first half (31) and the second half (312) are mounted around the steering bar (22). Multiple through holes (34) are defined in the first half (31), and corresponding threaded holes (not numbered) are defined in the second half (312). Bolts (not numbered) extend through the through holes (34) in the first half (31) and are screwed into the corresponding threaded holes in the second half (312). Accordingly, the halves (31,312) can be securely attached to the steering bar (22) by the bolts. In addition, a through hole (221) is defined in steering bar (22), and a stub (35) laterally extends from the second half (312) and extends into the through hole (221) in the steering bar (22). Consequently, the cam (30) can be kept from rotating relative to the steering bar (22) by means of the engagement of the stub (35) and the through hole (221) in the steering bar (22). The cam (30) has a substantially circular periphery (32) comprising a plain portion (39) and a notch (33) defined in the periphery (32) of the cam (30). In practice, the notch (33) is defined in a direction along the travel direction of the electric scooter (10).

The switch (37) is secured to the body (20) of the electric scooter (10) and is electrically connected to the actuator (15) or the controller (17). A button (372) is mounted on the switch (37) to control the operation of the switch (37). An arm (371) is pivotally attached to the switch (37) and has a distal end abutting the inner surface of the notch (33). The arm (371) will be kept far from the button (372) on the switch (37) in an original position.

Figure 4:
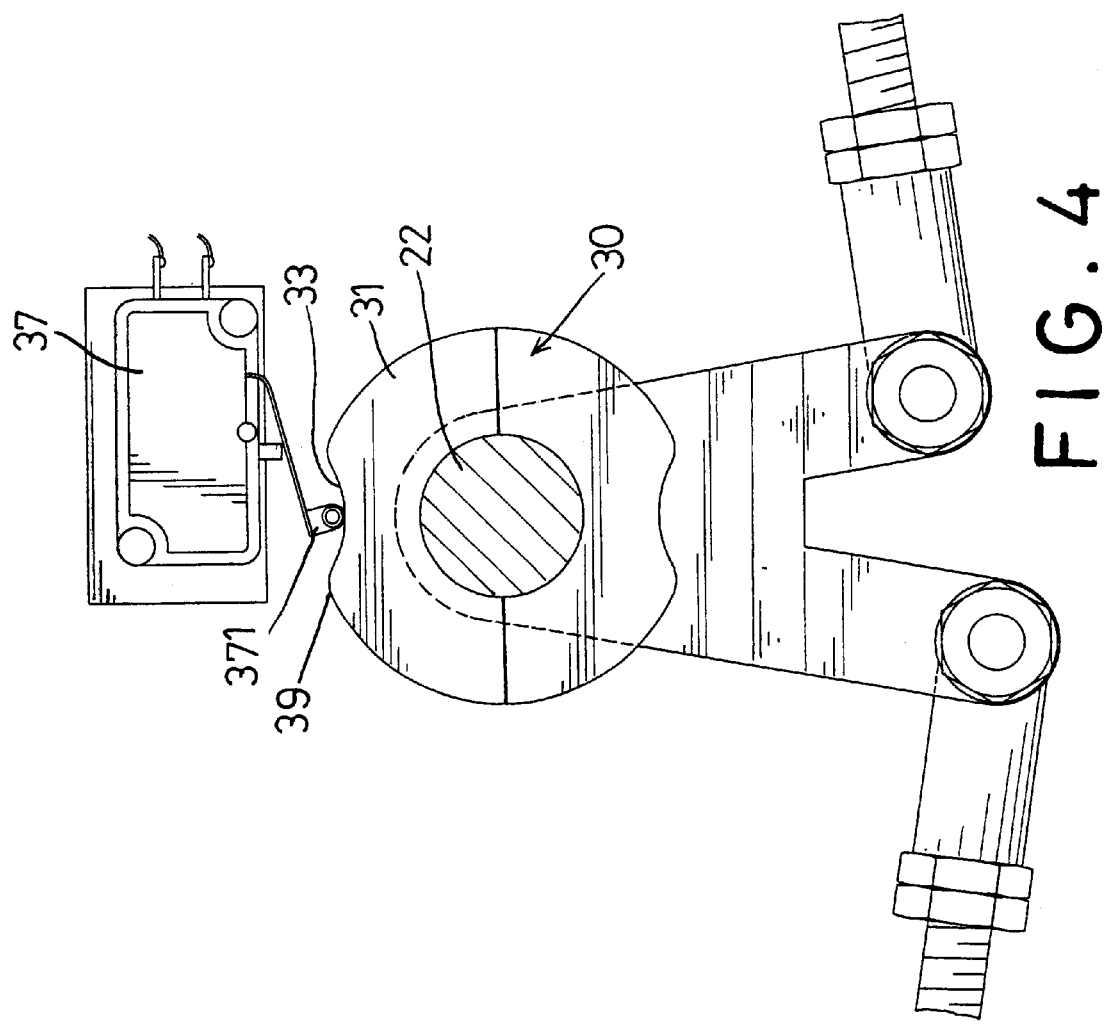
FIG. 4 is a top plan view of the brake device showing that the scooter moves forward.

In operation, with reference to FIGS. 1 and 4, when the scooter (10) moves forward in a straight direction, the distal end of the arm (371) will be received in the notch (33). The arm (33) is far from the button (372), and the switch (37) does not send any signal to the actuator (15) or the controller (17), such that the scooter (10) moves in a desired direction and speed.

Figure 5:
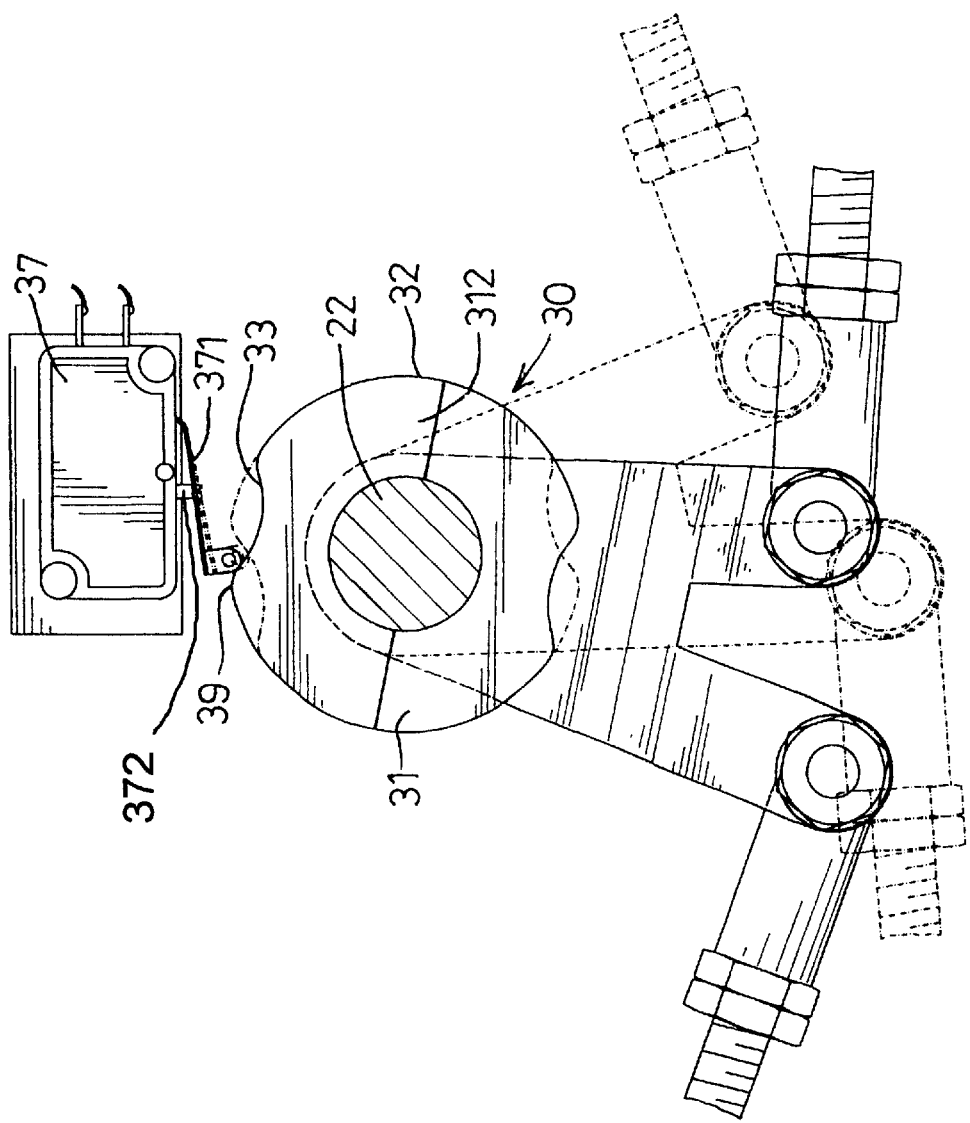
FIG. 5 is an operational top plan view of the brake device showing that the scooter is turned right or left.

With reference to FIGS. 1 and 5, when the user turns the scooter (10) right or left and pivotally rotates the steering bar (22) relative to the body (20), the cam (30) will rotate with the steering bar (22). The distal end of the arm (371) will escape from the notch (33) and will abut the plain portion (39) of the periphery (32) of the cam (30) due to the rotation of the cam (30). The plain portion (39) of the periphery (32) of the cam (30) will push the arm (371) closer to the switch (37) so as to push the button (372) on the switch (37). The switch (37) will send a signal to the actuator (15) or the controller (17) to slow down the actuator (15). Accordingly, the speed of the scooter (10) will be automatically slowed down when the scooter (10) is turned right or left even if the user does not use the hand brake or foot brake. Thus, the scooter (10) can turn at a low speed, and the safety of riding the scooter (10) is improved over the prior art.

Although the invention has been explained in relation to its preferred embodiment, it is to be understood that many other possible modifications and variations can be made without departing from the spirit and scope of the invention as hereinafter claimed.

What is claimed is:

1. A brake device for an electric scooter having a body, at least one front wheel rotatably attached to one end of the body, two rear wheels rotatably attached to the other end of the body, an electric actuator mounted on the body to actuate the rear wheels to rotate and a steering bar rotatably attached to the body to pivotally rotate the at least one front wheel relative to the body, the brake device comprising:

a cam adapted to be securely attached to the steering bar and having a circular periphery, a notch defined in the periphery of the cam and plain portion of the periphery of the cam; and a switch with a button adapted to secured to the body of the electric scooter and adapted to be electrically connected to the actuator, the switch having an arm with a distal end abutting the periphery of the cam, wherein the cam is composed of a first half and a second half engaging with the first half;

the halves are adapted to be mounted around the steering bar;

the first half has multiple through holes defined in the first half;

the second half has multiple threaded holes defined in the second half and the multiple threaded holes correspond to the through holes in the first half; and multiple bolts are accordingly fitted to aligned pairs of the multiple through holes and multiple threaded holes, whereby the halves are adapted to be securely attached to the steering bar by the bolts; and the switch will send a signal to the actuator to slow down the actuator when the steering bar is rotated relative to the body and the distal end of the arm escapes from the notch and abuts the plain portion of the periphery of the cam to push the button on the switch.

2. The brake device as claimed in claim 1, wherein a stub laterally extends from the second half and is adapted to extend into the steering bar so as to keep the cam from rotating relative to the steering bar.

3. The brake device as claimed in claim 1, wherein the notch is defined in a direction along a travel direction of the electric scooter.

* * * * *